March 31, 1936.  W. GUMPRICH ET AL  2,036,042
DORMANT SCALE
Filed May 12, 1932  7 Sheets-Sheet 1
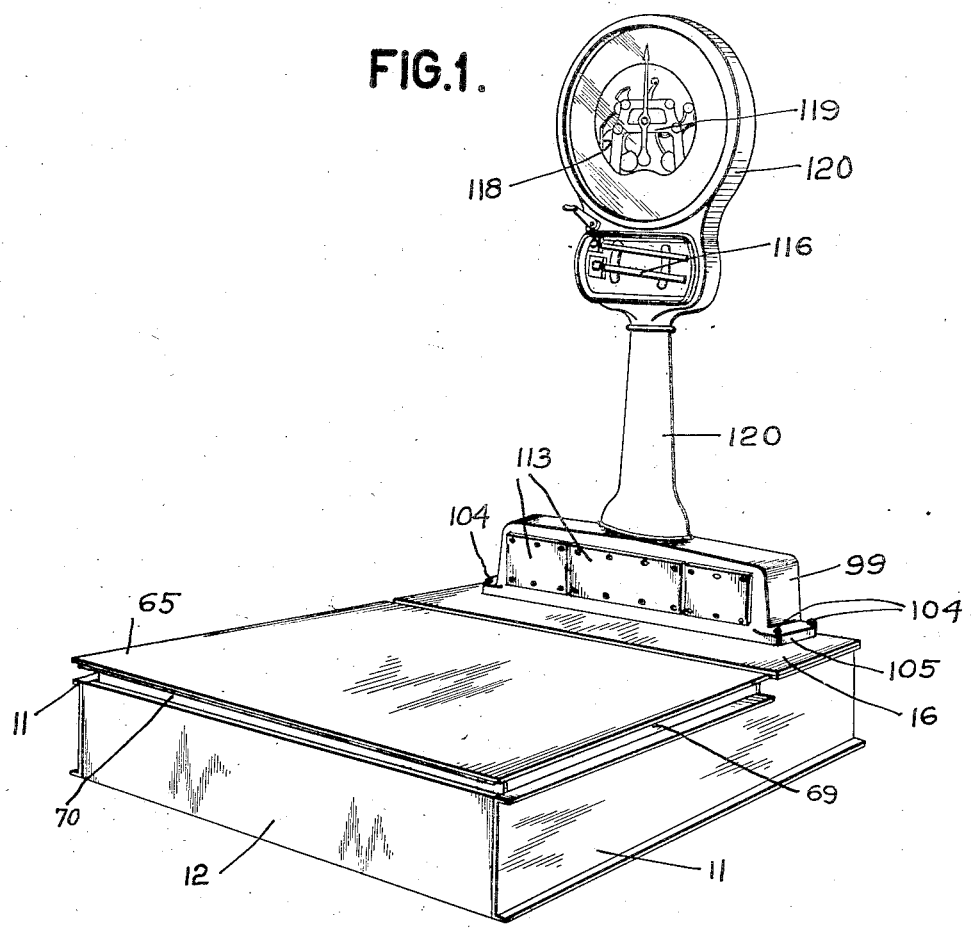
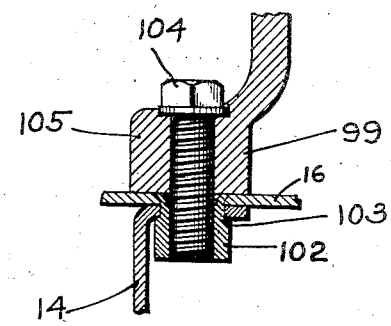

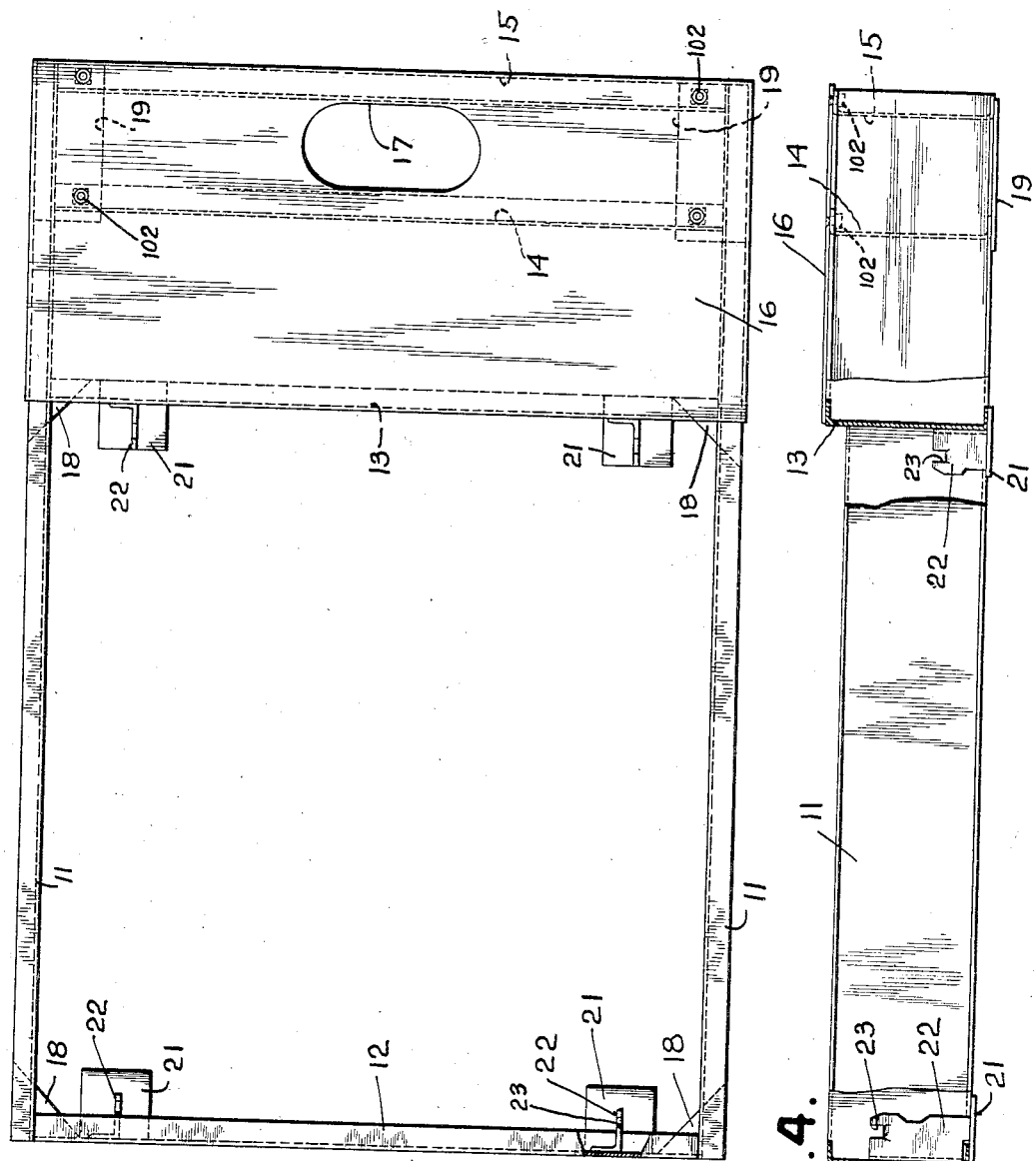

March 31, 1936.  W. GUMPRICH ET AL  2,036,042

DORMANT SCALE

Filed May 12, 1932   7 Sheets-Sheet 4

INVENTOR
William Gumprich
BY
ATTORNEY

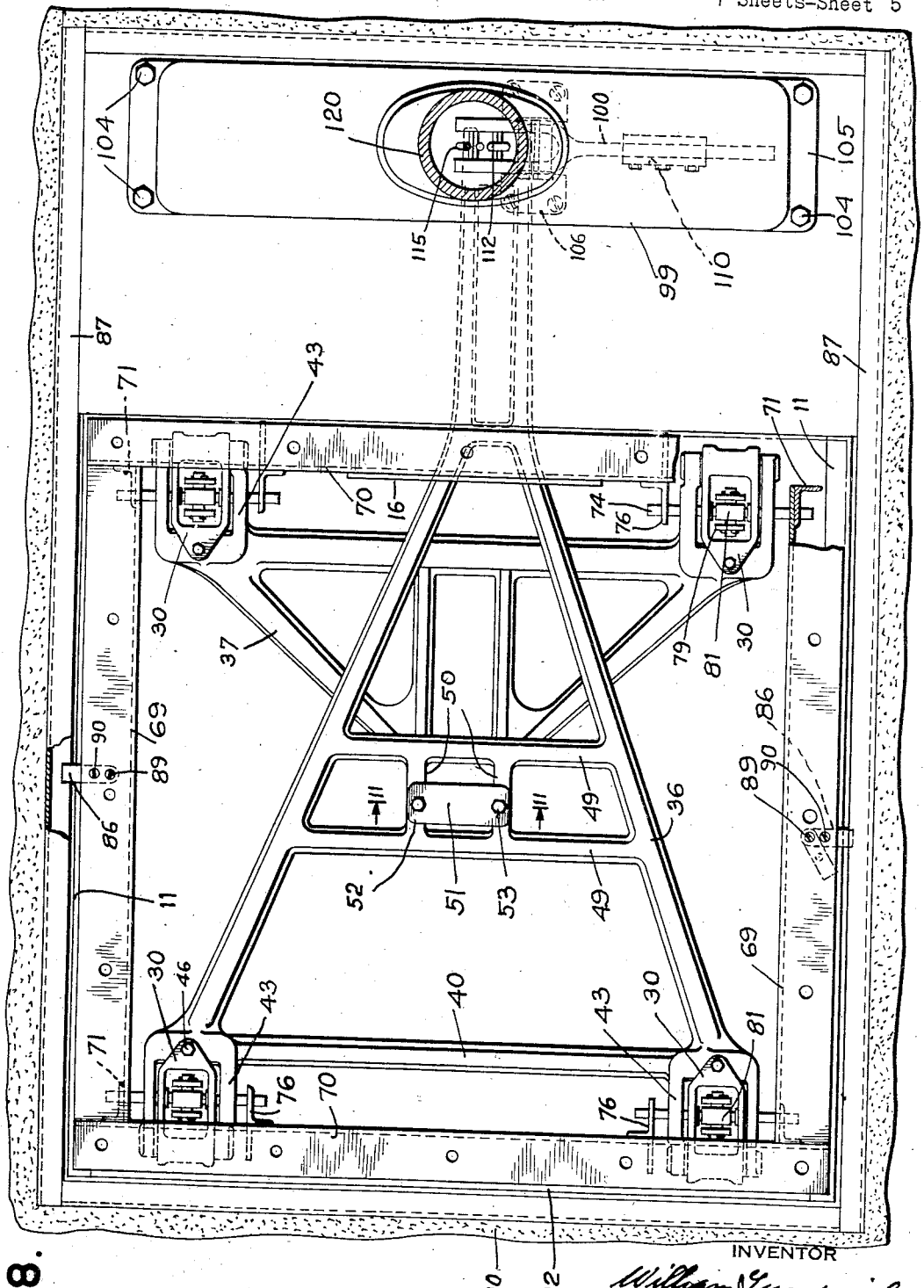

March 31, 1936.    W. GUMPRICH ET AL    2,036,042
DORMANT SCALE
Filed May 12, 1932    7 Sheets-Sheet 6
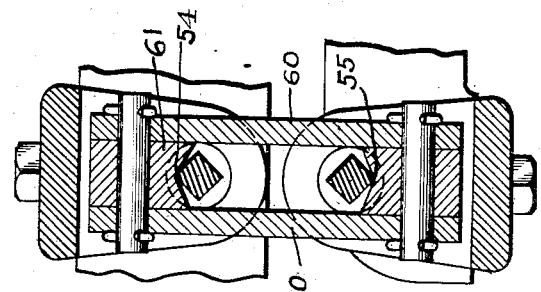
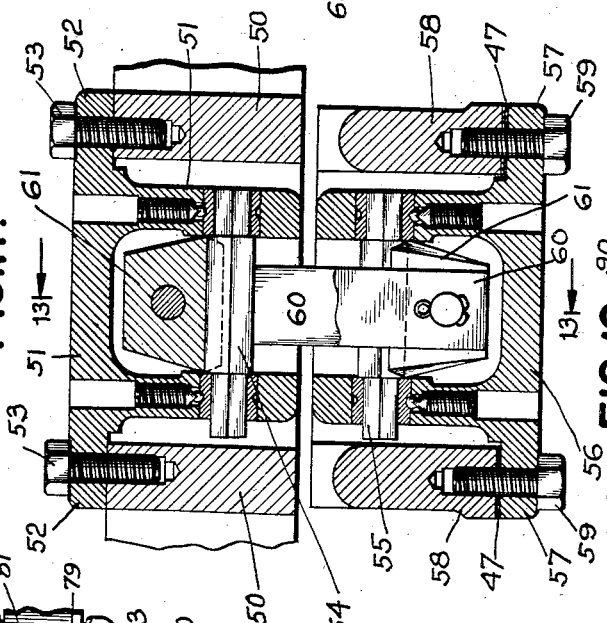
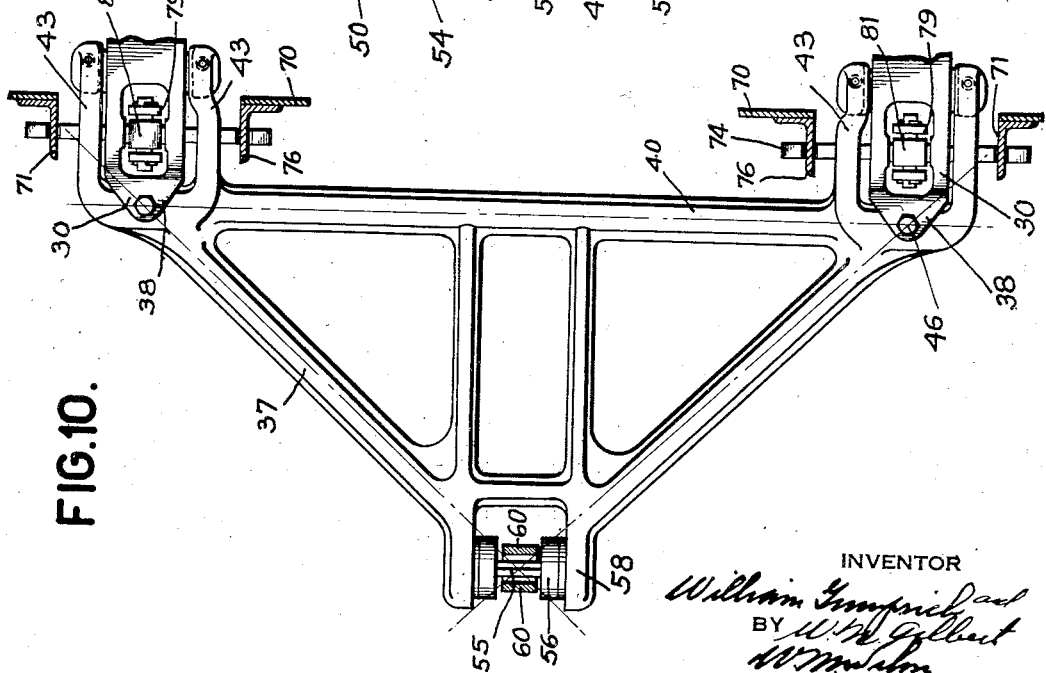
INVENTOR
William Gumprich
BY W. H. Gilbert
ATTORNEY March 31, 1936.   W. GUMPRICH ET AL   2,036,042
DORMANT SCALE
Filed May 12, 1932   7 Sheets-Sheet 7
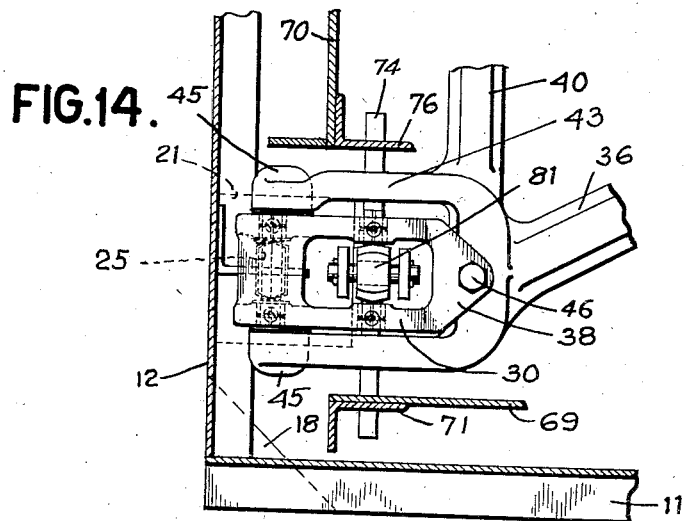
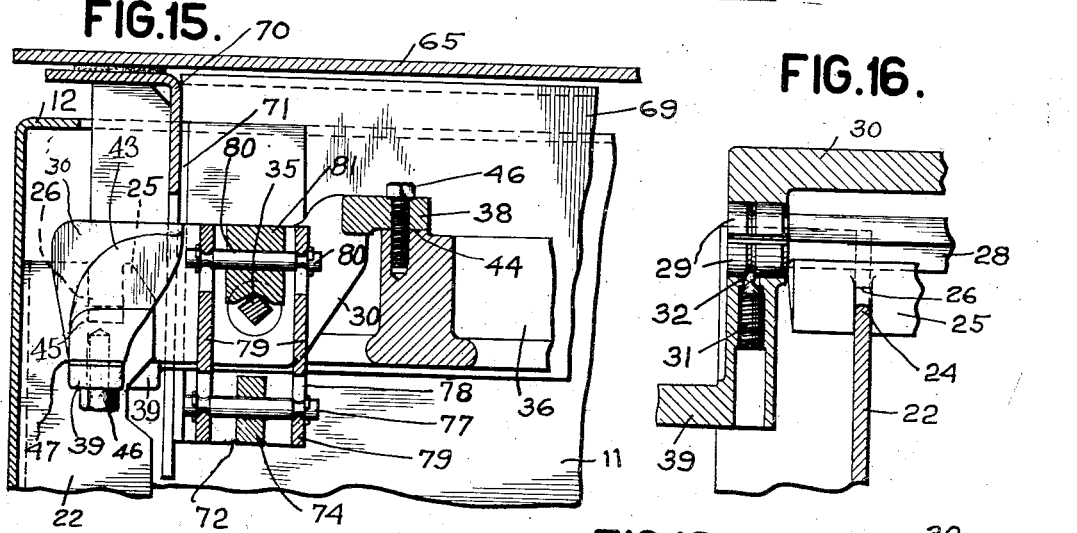
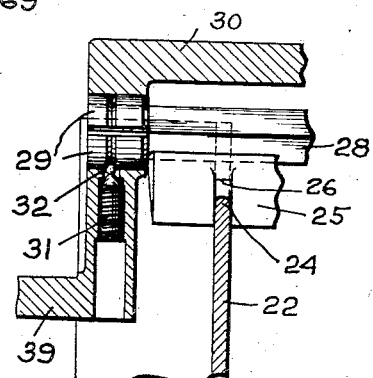
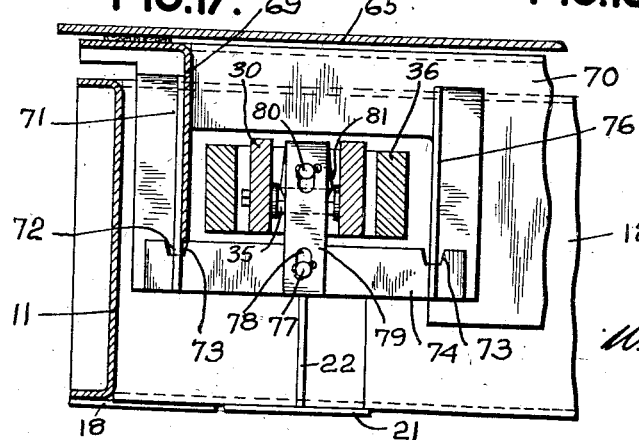
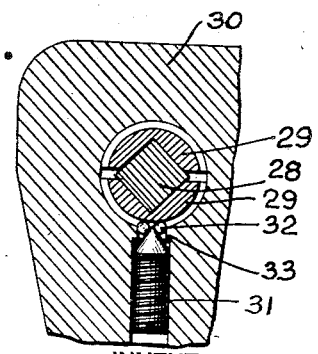
INVENTOR
William Gumprich
BY W. H. Gilbert
ATTORNEY Patented Mar. 31, 1936

2,036,042

UNITED STATES PATENT OFFICE 2,036,042

DORMANT SCALE

William Gumprich, Brooklyn, N. Y., and William N. Gilbert, Hudson Heights, N. J., assignors, by mesne assignments, to International Business Machines Corporation, New York, N. Y., a corporation of New York Application May 12, 1932, Serial No. 610,856

2 Claims. (Cl. 265—71)

This case relates to weighing scales, especially those known as "dormant" scales.

The object of the invention is to provide improvements in the various parts of a dormant scale. These improvements are in the novel construction of base casing; a novel platform spider construction; novel hangers for suspending the platform and its spider from the levers; a novel arrangement of backweighting lever and casing therefor; novel lever structures; and novel fulcrum stands for the base levers.

Further and other objects and advantages will be hereinafter set forth in the accompanying specification and claims, and shown in the drawings, which by way of illustration show what is now considered to be the preferred embodiment of the invention.

In the drawings:

Fig. 1 is a perspective view of the scale outside the scale pit;

Fig. 3 is a detail plan view of the base casing;

Fig. 4 is a side view thereof partly broken away;

Fig. 8 is a plan section through the base with the platform removed and through the upper column;

Fig. 9 is a detail of the fastening between the deck plate of the base and the housing for the backweight lever;

Fig. 10 is a top view showing the short lever and its connections;

Fig. 11 is a detail of the center connections between the main or long and auxiliary or short levers;

Fig. 12 is a detail of the spider and base pit showing the check plates;

Fig. 13 is a section on line 13—13 of Fig. 11;

Fig. 14 is a detail showing a fork of a lever and the pivot box carried thereby, in their relation to the base housing;

Fig. 15 is a detail view of a connection from the platform to the pivot box and the fulcruming of the pivot box on the base;

Fig. 16 is a detail section taken longitudinally through a knife edge of the pivot box;

Fig. 17 is a detail of the platform connections to the spider; and

Fig. 18 is a detail end section of the pivot box knife edge retainers.

Figures 5, 6, 7:
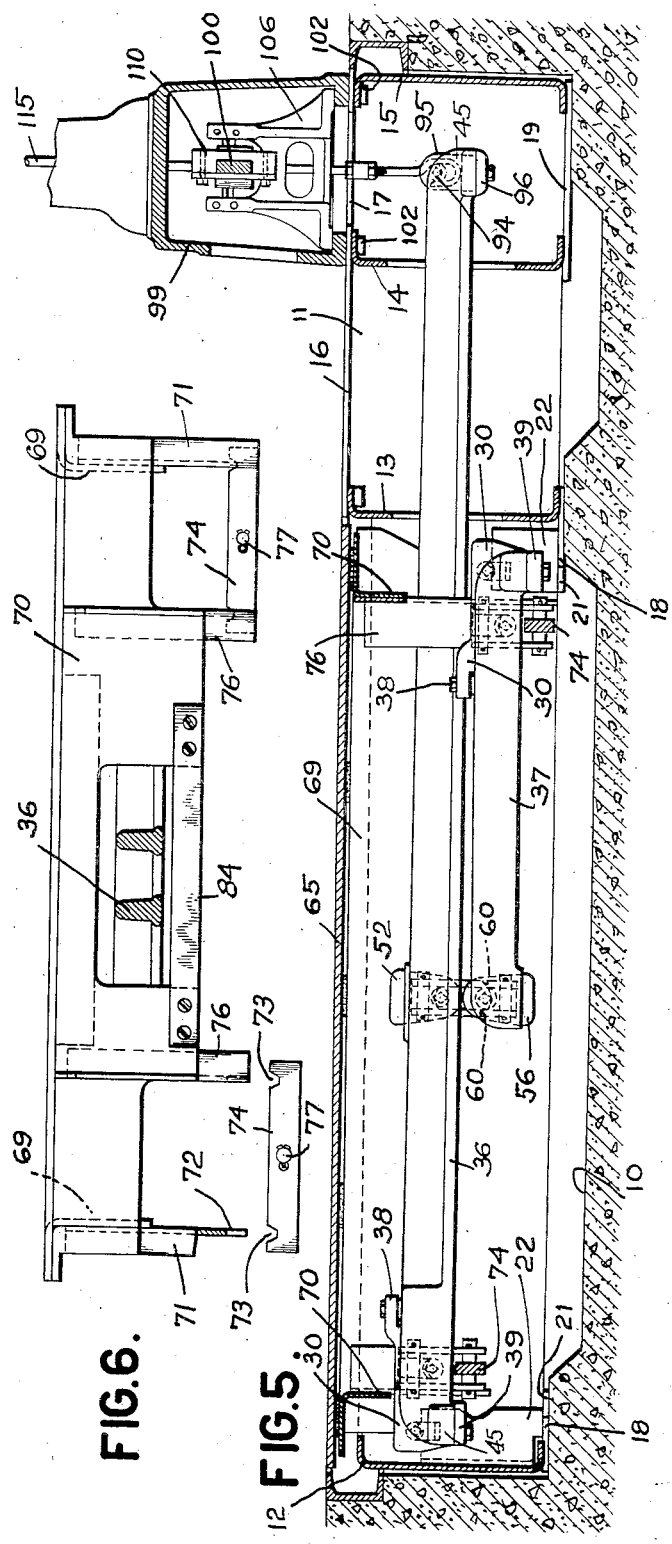
Fig. 5 is a side section through the lower part of the scale.
Fig. 6 is a view of the rear end of the platform spider.
Fig. 7 is a view of one of the sides of the scale base.

Referring to the drawings in detail, the base box which sets into the scale pit 10 is built up of channel plates the side plates 11 being similar outwardly facing channels (see Figs. 1, 2 and 7) having a rear integral channel section of greater height than the front channel section, this rear section being of such height as to bring it almost to the level of the floor in which the scale pit is formed. The front section is below the floor level in order that the platform which, as will be later explained, is supported above the front section may also be at about the floor level so that loads may be conveniently moved from the floor onto the platform. The front end of the base box consists of an inwardly facing channel plate 12. By facing this channel inwardly, the maximum space at the front end of the scale is made available for the accommodation of fulcrums for the base levers.

Parallel to plate 12 are three channel plates 13, 14 and 15; plates 11, 12, and 13 defining the front base section, and the rear higher portions of plates 11 defining with plates 13 and 15, the rear section. Welded onto the top flanges of the plates of the rear section is the deck plate 16 having an oval shaped hole 17 through which the connection from the base levers extends to the head mechanism and its housing to be described later which is supported on the deck. The maximum weight of the head mechanism and casing is on the rear portion of deck plate 16 and for this reason, channel bar 14 is provided to strengthen the rear section.

Reinforcing triangular corner plates 18 are welded across the corners to the bottoms of the channels 11, 12, and 13 while rectangular plates 19 are provided at each side of the base, each plate 19 being welded to and extending across the bottoms of channels 11, 14, and 15 to stiffen the rear portion of the base casing.

To support the fulcrums of the base levers, four fulcrum stands are provided, (see particularly Fig. 4) each consisting of a bottom plate 21 welded to the lower flanges of channels 12 and 13 of the front base section. Each plate carries a vertically disposed angle piece 22, the back of which is welded to the vertical portions of plate 12 or 13. Each angle piece 22 has cut therein a substantially rectangular notch 23, the bottom of the notch having a rounded edge to engage the bottom of slots 24 in bearing blocks 25 which are set into the notches 23. The walls of slots 24 engage the sides of the angle piece 22 to limit sidewise movement of the blocks relative to the fulcrum stand to a very small amount while permitting the block to rock slightly laterally of the notch 23 on the curved bottom edge thereof (see Fig. 16).

Thrust edges 26 are formed on bearing block 25 to engage the sides of the notch 23 and limit longitudinal movement of the block on support 22 (see Fig. 15). Resting on blocks 25 are the diamond shaped knife edges 28 of the base levers, hereinafter referred to as the fulcrum pivots. The blocks 25, being supported on stands 22 in the aforesaid manner permit self-alinement of the levers to a small degree, thus avoiding necessity for extremely fine adjustments of the fulcrum blocks 25 and their stands 22.

The fulcrum edges 28 are removably and adjustably gripped at each end by the two separate halves 29 of a collar which fits in a round hole formed in a pivot box 30. The halves 29 are forced together to securely grip the knife edge 28 by means of a screw 31 which spreads a pair of balls 32 apart to wedge them against the lower half 29 and force the latter towards the upper half. At the same time, the balls 32 are wedged against the walls of the slot 33 extending in the direction of the screw 31 and opening into the hole in which the collar halves 29 are inserted. Balls 32 thus act as a wedge lock to rigidly secure the collar against movement in the hole of the pivot box, while simultaneously locking the knife edge in position between the collar halves. The pivot box 30 rather than the lever to which it is attached is used to hold the knife edge 28 because being so much smaller than the lever it is easier to handle and machine so that it can be made far more accurate. Thus, the holes for supporting the collars and knife edges are more accurately alined and finished than would be possible if the holes were to be made and finished in the large lever itself which cannot be held as true in a finishing machine.

Pivot box 30 also carries in addition to a fulcrum pivot 28, the diamond shaped platform supporting load knife edge 35 secured in the pivot box in the same manner as the fulcrum knife edge and which is hereinafter termed a load pivot. There are four such pivot boxes 30, two for the long or main base lever 36 and two for the short or auxiliary base lever 37. Each pivot box 30 has a top central flange or ear 38 (see Figs. 10 and 15) and a pair of bottom flanges or ears 39 extending laterally from each side of the pivot box. At each end of the cross bar 40 forming the base of the triangular portion of the long lever 36 and short lever 37 is a rearward extension comprising a fork 43, (see Figs. 8 and 10) the furcations of which extend at right angles to the cross bar. Each fork 43 carries one of the pivot boxes 30, the central ear 38 of the latter engaging the flat top of a boss 44 formed at the central portion of the fork and lateral ears 39 engaging the bottoms of flat bosses 45 at the outer end of each furcation of the fork, bolts 46 passing through the ears and bosses for securing the pivot box to the lever fork, (see particularly Fig. 15). The pivot box may be universally adjusted by shims 47 placed between any of ears 38 and 39 and bosses 44 and 45. In Fig. 15, a shim 47 is shown at the rear end of pivot box 30 to raise the fulcrum pivot 28.

The triangular portion of the long base lever 36 is strengthened by two spaced parallel cross bars 49. The bars 49 are joined by longitudinal bars 50 equally spaced from the longitudinal center line of the lever. Bars 50 support between them a center pivot block 51 which has upper horizontal flanges 52 supported on the flattened tops of bars 50 and secured thereto by bolts 53 (see Fig. 11). The pivot block 51 being small, is easily and accurately machined before attachment to the lever in the same manner and to the same advantage as pivot boxes 30. The block 51 carries a center knife edge 54 secured therein by means such as described in connection with the knife edges in pivot block 30.

The short lever 37 is A-shaped, the nose pivot 55 thereof being at the apex of a triangle of which the center line of base 40 extends along a line drawn through the bolts 46 attaching the pivot boxes to the rear forks of the lever, and of which the sides are the center lines of the lever legs. This is done because it is found by tests that the weight of a load transmitted to each leg of the lever is applied at the point attaching a pivot box 30 to the boss 45 and to avoid twisting stresses on the legs of the lever, it is desirable that the force at these points be carried in a straight line to the nose pivot 55 of the short lever which in turn transmits the force to the center pivot 54 of the long lever. When the force of the load is transmitted from the rear of the lever to the nose pivot along a line which does not coincide with the lever leg, the latter is placed under a twisting or torsional stress which tends to distort the lever from true shape.

Nose pivot 55 is secured in a pivot block 56 in the manner of the knife edges in pivot block 30, the block 56 having flanges 57 contacting the flat bottoms of furcations 58 at the nose end of the short lever and secured to the furcations by bolts 59.

A self-alining connection between pivots 54 and 55 is provided by a pair of links 60, upper and lower ends of which pivotally carry grooved bearings 61 engaging the pivots 54 and 55.

The platform 65 is supported on an open rectangular spider, the sides 69 and ends 70 of which are angle plates welded together at the corners. Referring to Figs. 14, 15, and 17, particularly, the spider is reenforced at each corner by a vertical angle piece 71 disposed within the angle of bar 69 and having one side welded to the base of this bar and the other side welded to the back of end bar 70.

Angle pieces 71 serve not only as reenforcements but have notches 72 at the lower ends to engage one of the V-notches 73 at one end of a short cross bar 74 the V-notch 73 at the other end being similarly engaged by the lower end of an angle piece 76 welded to the base of end bar 70. The bar 74 has removably fixed thereto a center pin 77 having grooved portions at each end rotatably received in the lower elongated slots 78 of suspension links 79 which have similar slots in the upper end to rotatably receive grooved ends of a pin 80 secured to a V-grooved block 81, the latter resting on one of the load knife edges 35. The platform spider is suspended in this manner at each corner from a load pivot 35. By reason of bar 74 having equal loads transmitted thereto at each end by angle pieces 71 and 76 and its being very short, the bar does not have a tendency to spring or distort under the loads.

Each end angle 70 is cut out at the ends to form a passageway for the forked ends 43 of the levers, the fulcrum stands 21—22 being outside the limits of the platform spider.

The rear angle 70 (see Fig. 6) is also cut out at the center to form a passageway for the forward end of the long lever 36. A tie bar 84 is secured to this angle bar 70 to span the bottom of the central cut out portion and strengthen the bar 70 against deflections under load. The forward end of the long lever passes above the tie bar 84.

In order to prevent the platform spider from tipping up too far at one side when a heavy load is placed too much to the other side, check elements 86 (see Figs. 8 and 12) are provided at each side of the spider to engage the bottom of horizontally extending flanges 87 of the scale pit frame to limit upward movement of the platform spider. The elements 86 can be located in operating position only after the spider is placed on the base levers, since the bases of angle bars 69 prevent manipulation of the elements from inside the spider.

The following means is provided to position and fix the elements 86 in place after the spider is assembled on the levers. The top flange of a bar 69 has two counter-sunk holes for receiving the heads of screws 89 and 90 threaded into a check element 86. The head of screw 89 has a loose fit in its hole and is rigidly fastened to element 86 by a nut 91. Initially, the element 86 is held to the bar 69 by screw 89 alone which acts as a pivot for the element to permit it to be turned to the dotted line position as shown in Fig. 8. After the spider is assembled in the base, the screw 89 is rotated and since the screw is rigidly fastened to the check element 86, rotation of the screw also rotates the check element to position the check element in operating, full line position. Screw 90 is then inserted and threaded into element 86 to hold it in place beneath flange 87 of the scale pit.

The nose pivot 94 of the long lever 36 (see Fig. 5) is secured in a pivot box 95 in the same manner as the pivots in box 30. Pivot box 95 has ears 96 for contact with the lower flat portions of the nose end of the long lever and screws passing through these ears are threaded into these portions to hold the pivot to the lever.

Supported on the deck plate 16 of the base casing is an intermediate housing 99 for enclosing and supporting the backweighting lever 100 which is intended mainly to provide a rough zero adjustment. As it is impossible to reach beneath the deck plate for manipulating a nut or bolt from the bottom of the plate to secure the housing 99 thereto, heavy securing screws are used. If the deck and upper flange of the channels 14 and 15 were themselves threaded, the thread would be too short. To provide a long threaded element to coact with the screws, at the time the base casing is assembled, internally threaded bushings 102 (see Fig. 9) are secured to the deck 16 and channels, 14 and 15, the bushings having shoulders 103 for engaging the bottom of the upper flanges of the channel bars to locate the bushings and reduced portions passing through alined holes in these flanges and the deck plate.

The upper end of the bushing is expanded into the hole in the deck plate to firmly fasten the bushing in place. The periphery of the bushing is square and positioned so close to the sides of bars 14 and 15 that rotation thereof is limited by these bars.

Figure 2:
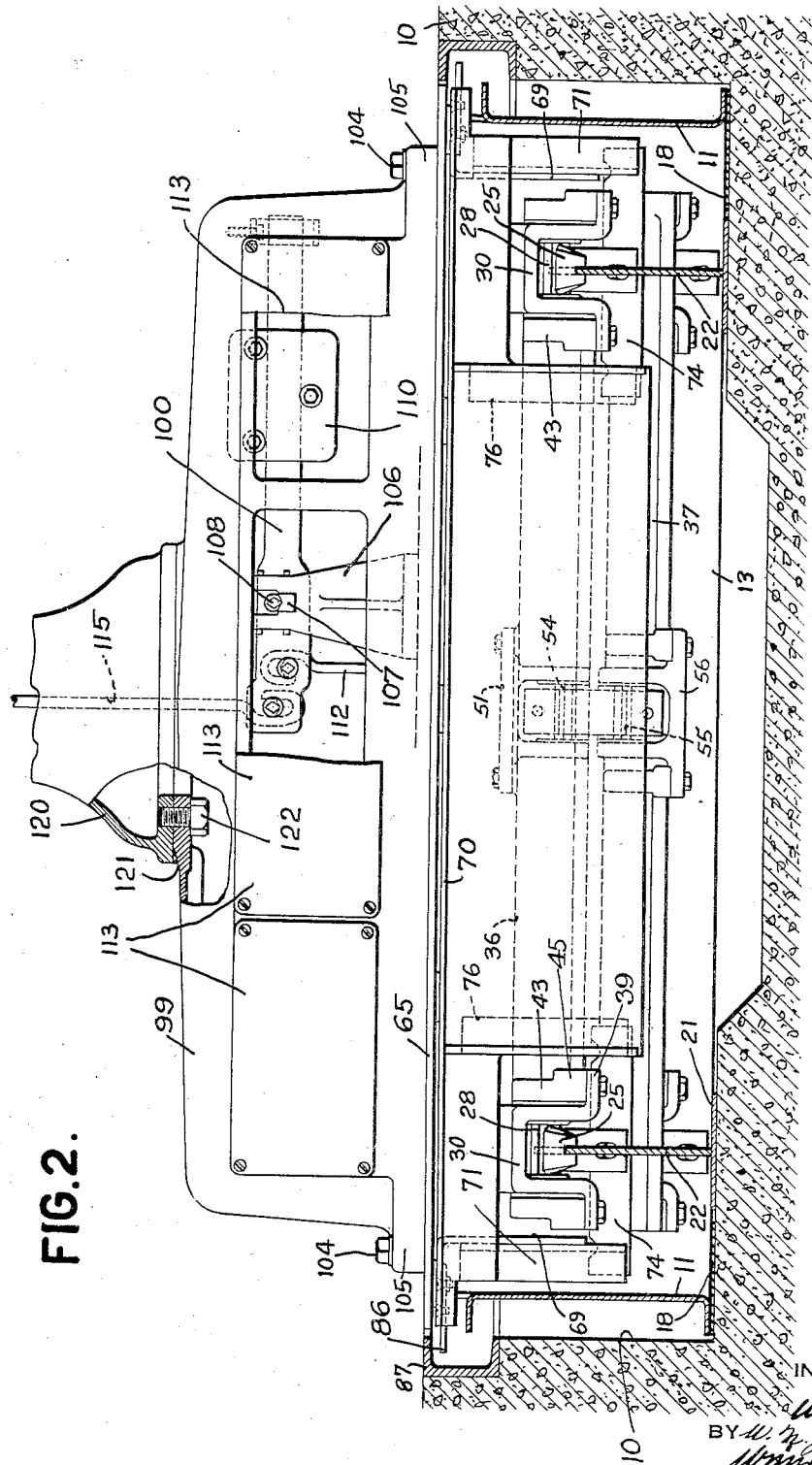
Fig. 2 is a front view of the base and backweighting portions of the scale when in the scale pit, partly sectioned.

The housing 99 is now secured to the deck plate 16 by screws 104 passing through holes in flanges 105 of the housing and threaded into bushings 102. A lever stand 106 fastened to the bottom of housing 99 carries a V-groove bearing 107 for supporting the fulcrum knife edge 108 secured to the lever in the manner of the pivots in pivot box 30. The lever 100 carries a poise 110 which tends to rock the lever 100 clockwise, as viewed in Fig. 2, thus opposing downward movement of the nose end of the long lever which is connected thereto by link 112. The front of housing 99 is grilled to provide openings through which the poise and other parts in the housing may be adjusted and inspected. Plates 113 are secured to the housing to ordinarily cover the grilled front of the housing and prevent dirt and dust from entering into the housing. The left end of the lever 100, as viewed in Fig. 2 is connected to a link 115 which is in turn connected to tare lever 116 of the head mechanism. The lever is connected by a tape 118 to the pendulum and indicator system 119 as fully disclosed in Patent No. 1,821,087.

The head mechanism consisting of all the parts of the scale above the intermediate housing 99 is enclosed and carried by a column and dial housing 120 secured at the bottom to the flattened boss 121 at the top of the housing 99 by bolts 122.

The base portion of the scale, the intermediate backweighting portion, and the head portion are separate, enclosed, self-contained and assembled units. Each unit may be used in a different scale; for example, the head unit may be applied to a different type of base, the base unit may be used with different head mechanisms, and the backweighting unit may be used with different sizes and capacities of bases and head mechanism.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

We claim:
1. A scale comprising a platform, a platform spider for supporting the platform and comprising a frame with substantially closed sides, base levers connected to the spider, a base frame and housing for the base levers, check elements for engaging horizontal portions of said base housing to limit the rise of the platform, and means for mounting the check elements on the spider for horizontally directed adjusting movement from positions clear of and remote from the aforesaid horizontal portions to positions underlying the aforesaid horizontal portions.

2. The scale as defined in claim 1, and means cooperating with the check elements and spider for fixing the check elements in their operative positions with respect to the aforesaid horizontal portions of the aforesaid base housing.

WILLIAM GUMPRICH.
WILLIAM N. GILBERT.